United States Patent [19]

Stecher et al.

[11] Patent Number: 5,186,051
[45] Date of Patent: Feb. 16, 1993

[54] DEVICE FOR MEASURING A FLOWING AIR QUANTITY

[75] Inventors: Günther Stecher, Ludwigsburg; Hans Hecht, Korntal; Dietrich Bergfried, Böblingen; Botho Ziegenbein, Reutlingen; Richard Muehlheim, Tübingen, all of Fed. Rep. of Germany

[73] Assignee: Robert Bosch GmbH, Stuttgart, Fed. Rep. of Germany

[21] Appl. No.: 656,097
[22] PCT Filed: Aug. 9, 1989
[86] PCT No.: PCT/DE89/00524
§ 371 Date: Feb. 27, 1991
§ 102(e) Date: Feb. 27, 1991
[87] PCT Pub. No.: WO90/02317
PCT Pub. Date: Mar. 8, 1990

[30] Foreign Application Priority Data

Aug. 29, 1988 [DE] Fed. Rep. of Germany ... P3829194.0

[51] Int. Cl.$^5$ .............................. G01F 1/68
[52] U.S. Cl. ................................ 73/204.26
[58] Field of Search ............. 73/204.16, 204.26

[56] References Cited

U.S. PATENT DOCUMENTS 4,382,247 5/1983 Stecher et al. ................. 338/42
4,777,820 10/1988 Hecht et al. ................ 73/204.26
4,831,876 5/1989 Porth et al. ................. 73/204.26

FOREIGN PATENT DOCUMENTS 0271660 6/1988 European Pat. Off. .

Primary Examiner—Herbert Goldstein
Attorney, Agent, or Firm—Frishauf, Holtz, Goodman & Woodward

[57] ABSTRACT

A device for measuring a flowing air quantity is proposed which comprises a sensor element which is exposed to the flowing air, is constructed in thick-film technology and contains a heating film resistor ($R_H$), which is arranged on an insulating substrate (10) and through which current flows, and a sensor film resistor ($R_S$) which is likewise arranged on the insulating substrate (10), serves to sense the temperature of the heating film resistor ($R_H$) and is a component of a bridge circuit. The heating film resistor ($R_H$) and the sensor film resistor ($R_S$), separated from one another by an intermediate film (13) which is a good conductor of heat but is electrically insulating, are accommodated in a bubble (11) which is made of ceramic material, in particular of glass ceramic, and is arched on the insulating substrate (10). The thin diaphragm (14) made of a ceramic material ensures effective thermal uncoupling of the film resistors ($R_H$, $R_S$) from the insulating substrate (10). Short response times are thereby achieved.

8 Claims, 4 Drawing Sheets

DEVICE FOR MEASURING A FLOWING AIR QUANTITY

PRIOR ART

The invention relates to a device for measuring a flowing air quantity.

A device for measuring a flowing air quantity according to the generic category of the main claim is already known from SAE Technical Paper Series 880,560, pages 105–109, in which device the heating film resistor is arranged on one side of the insulating substrate and the sensor film resistor serving to sense the temperature of the heating film resistor is arranged on the other side of the insulating substrate, opposite the heating film resistor, these two resistors being applied in a planar form to the flat surface of the insulating substrate. However, since the insulating substrate, for reasons of stability, must not fall below a certain minimum thickness, a construction of this type means that the thermal coupling between the two abovementioned resistors via the insulating substrate lying in between cannot be sufficient. On the one hand, the thermal transfer through the insulating substrate does not take place quickly enough; on the other hand, a portion of the dissipated heat developing in the heating film resistor is dissipated laterally in the insulating substrate parallel to the substrate surface so that the temperature sensing by means of the sensor film resistor is inaccurate and sluggish.

Furthermore, U.S. Pat. No. 4,382,247, Stecher et al./Bosch, discloses a pressure cell which contains a pressure-sensitive diaphragm which consists of a bubble which is made of glass ceramic and is produced on an insulating substrate in thick-film technology.

ADVANTAGES OF THE INVENTION

Compared with the known device described at the beginning for measuring a flowing air quantity, the device according to the invention for measuring a flowing air quantity, has the advantage that the sensor film resistor and the heating film resistor are uncoupled thermally in a very effective manner from the insulating substrate and from the further components applied to the latter if need be, and that the mutual thermal coupling between the sensor film resistor and the heating film resistor is considerably improved. Short response times are thereby achieved. Another advantage is very effective thermal uncoupling of the further sensor film resistor from the insulating substrate and a very effective thermal coupling of this resistor to the air flowing past, whose temperature is to be measured by this resistor. Further advantages will be apparent from the description.

BRIEF FIGURE DESCRIPTION

The invention is described in greater detail with reference to the drawing, in which:

FIG. 1 shows the electrical circuit diagram of a known air-mass flow meter and the air-mass flow meter according to the invention, FIG. 2 shows an air-mass flow meter according to the invention, partly in circuit diagram, partly in the schematically represented plan view of a sensor element constructed in thick-film technology, FIG. 3 shows a section along the line III—III in FIG. 2, FIG. 4 shows a section along the line IV—IV in FIG. 2, FIG. 5 schematically shows an air-mass flow meter according to the invention for measuring the air quantity drawn in the suction pipe of a motor vehicle.

DETAILED DESCRIPTION

Figure 1:
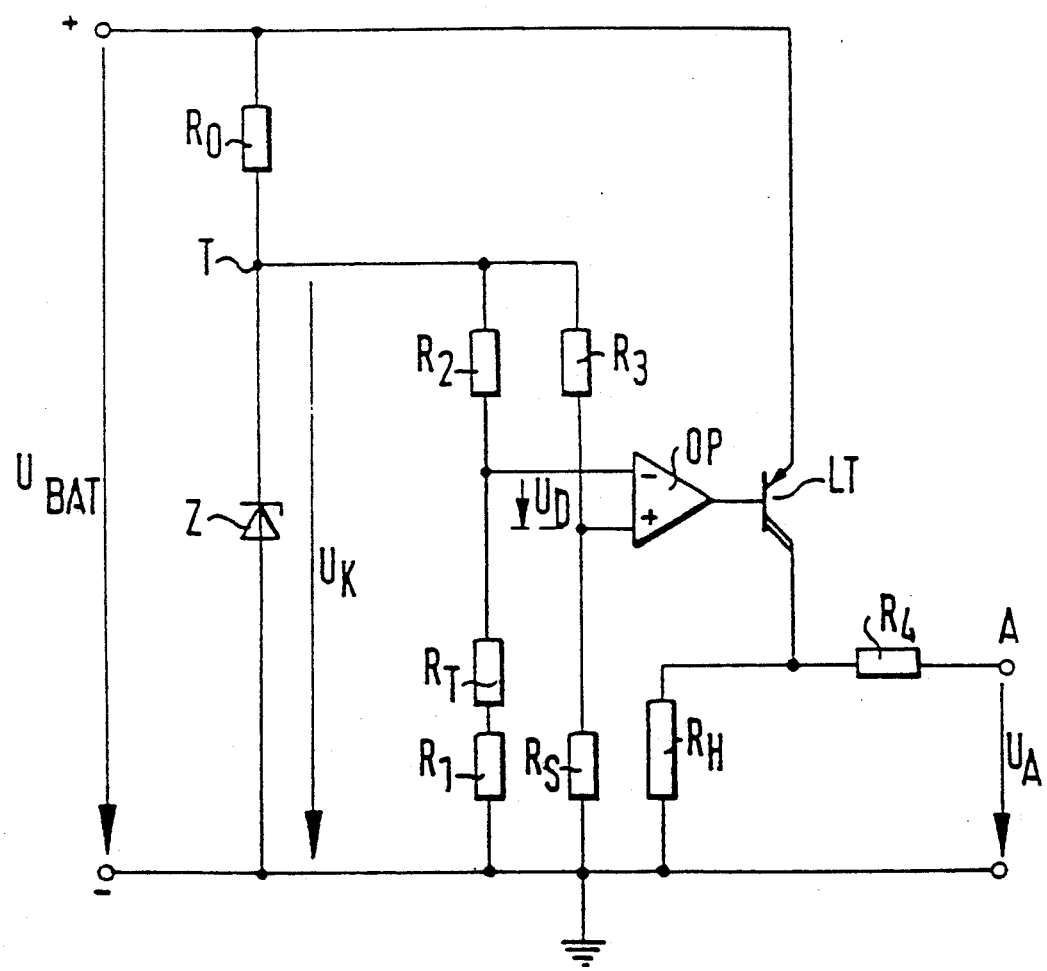

The air-mass flow meter shown in FIG. 1 in its electrical circuit diagram contains a bridge circuit which interacts in a manner known per se with an externally arranged heating film resistor $R_H$, thermally coupled to one of the bridge resistors, in such a way that the heating current flowing through the heating film resistor is a measure of the air quantity flowing past.

Connected to the voltage $U_{BAT}$ of a motor-vehicle battery is a voltage divider consisting of a resistor $R_o$ and a zener diode Z, the negative pole of the battery and the anode of the zener diode at the same time being connected to earth. A largely constant voltage $U_K$ is provided between the tap T of the voltage divider $R_o$, Z and earth. A first bridge branch of a bridge circuit consisting of the resistors $R_2$, $R_T$ and $R_1$ is connected to the voltage $U_K$, with which first bridge branch a second bridge branch consisting of the resistors $R_3$ and $R_S$ is connected in parallel. The connecting point between the resistors $R_2$ and $R_T$ is placed at the inverting input and the connecting point between the resistors $R_3$ and $R_S$ is placed at the non-inverting input of an operational amplifier OP whose output is connected to the base of a power transistor LT. The emitter of the power transistor LT is applied to the positive terminal of the battery. The collector of the power transistor LT is connected to ground via the heating film resistor $R_H$, the heating film resistor $R_H$ being thermally coupled to a sensor film resistor $R_S$, which is a component of the bridge circuit Furthermore, the collector of the power transistor LT is connected via a resistor $R_4$ to the output terminal A of the air-mass flow meter. The output voltage $U_A$ tapped between the terminal A and ground is a measure of the quantity, to be measured, of the air flowing past.

In detail, the mode of operation of the circuit arrangement according to FIG. 1 is as follows:

In the stationary state, the resistance bridge $R_1$, $R_T$, $R_2$, $R_3$, $R_S$ is balanced in such a way that only a very small differential voltage $U_D$ is applied to the operational amplifier OP. This differential voltage $U_D$, via the operational amplifier OP, controls the power transistor LT, which limits the current for the heating film resistor $R_H$ in the stationary state. In every operating state (at any flow quantity), the heating film resistor $R_H$ and thus also the sensor film resistor $R_S$ have approximately the same temperature and thus also a certain resistance value.

If the flow quantity of the flowing air changes, the cooling conditions for the heating film resistor and sensor film resistor change. If, for example, the air mass is increased, both resistors $R_H$ and $R_S$ are cooled to a greater extent. The resistor $R_S$ thereby receives a higher resistance value, which detunes the bridge. The differential voltage $U_D$ consequently increased, leads, via the operational amplifier OP and the power transistor LT, to an increased current through the heating film resistor $R_H$, which heats up until both resistors $R_H$ and $R_S$ have again reached their initial temperature and the bridge is again virtually balanced.

Figure 2:
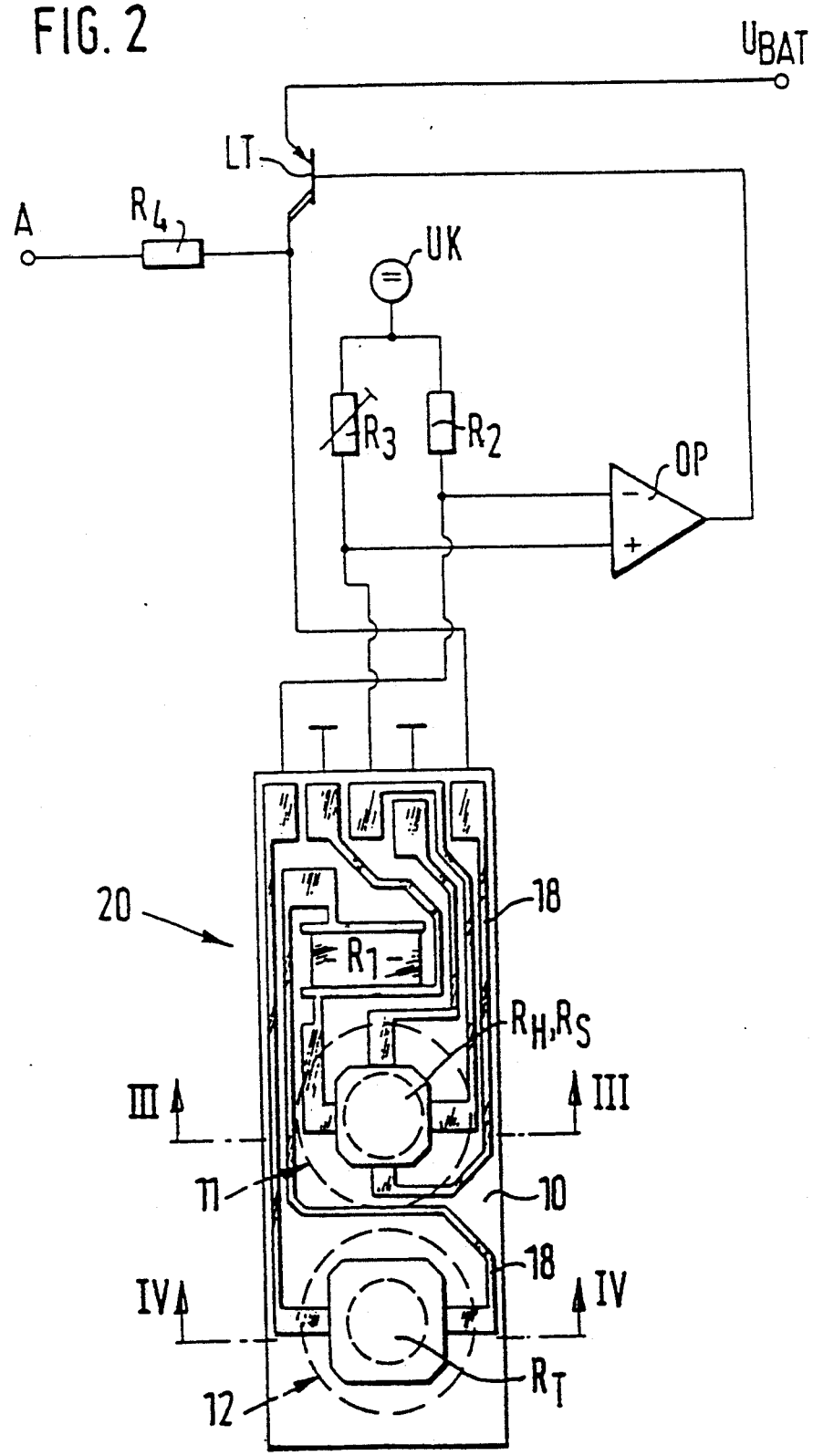

In the exemplary embodiment, shown in FIG. 2, of an air-mass flow meter according to the invention, the resistors $R_1$, $R_H$, $R_S$ and $R_T$ from FIG. 1 are integrated on a ceramic substrate 10 (FIG. 3) in thick-film technology and form, together with the substrate 10, the sensor element exposed to the flowing air.

The resistor $R_1$ is applied to the ceramic substrate 10 in a planar form in conventional thick-film technology.

On the other hand, the resistors $R_H$ and $R_S$, likewise produced in thick-film technology, are accommodated in a thick-film bubble 11 in such a way that they conduct heat readily but are electrically insulated from one another, which thick-film bubble 11 is arched on the ceramic substrate 10 above a platform 17 (FIG. 3) arranged on the latter and is indicated by a broken line in FIG. 2.

The further sensor film resistor $R_T$ serving to sense the temperature of the flowing air quantity is accommodated in a similar manner to the two resistors $R_H$ and $R_S$ in a further thick-film bubble 12, which is likewise indicated in FIG. 2 by a broken line.

Figure 3:
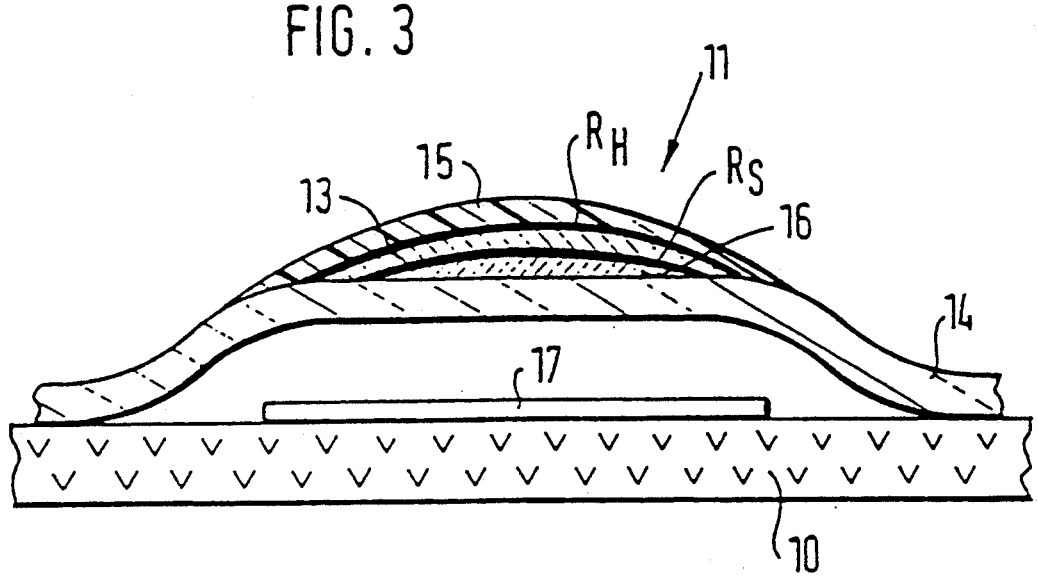

FIG. 3 shows a section along the line III—III in FIG. 2. As can be recognized from FIG. 3, the two film resistors $R_H$ and $R_S$ are separated from one another in the thick-film bubble 11 by an intermediate film 13 of glass. The intermediate film 13 electrically insulates the two film resistors $R_H$ and $R_S$ from one another, but on the other hand is constructed so as to conduct heat readily so that the dissipated heat produced in the resistor $R_H$ can easily pass to the sensor film resistor $R_S$.

The diaphragm 14 of the bubble 11 is produced in thick-film technology and strengthened by the inclusion of glass The film system consisting of the heating film resistor $R_H$, the intermediate film 13 and the sensor film resistor $R_S$ is arranged on the diaphragm 14, the sensor film resistor $R_S$ lying between the diaphragm 14 and the heating film resistor $R_H$. A protective film 15 is applied to the heating film resistor $R_H$. An intermediate film 16 made of glass is arranged between the sensor film resistor $R_S$ and the diaphragm 14.

Differing from the arrangement shown in FIG. 3, the two film resistors $R_H$ and $R_S$ can also be interchanged in their position, i.e. the heating film resistor $R_H$ can be arranged between the diaphragm 14 and the sensor film resistor $R_S$.

Figure 4:
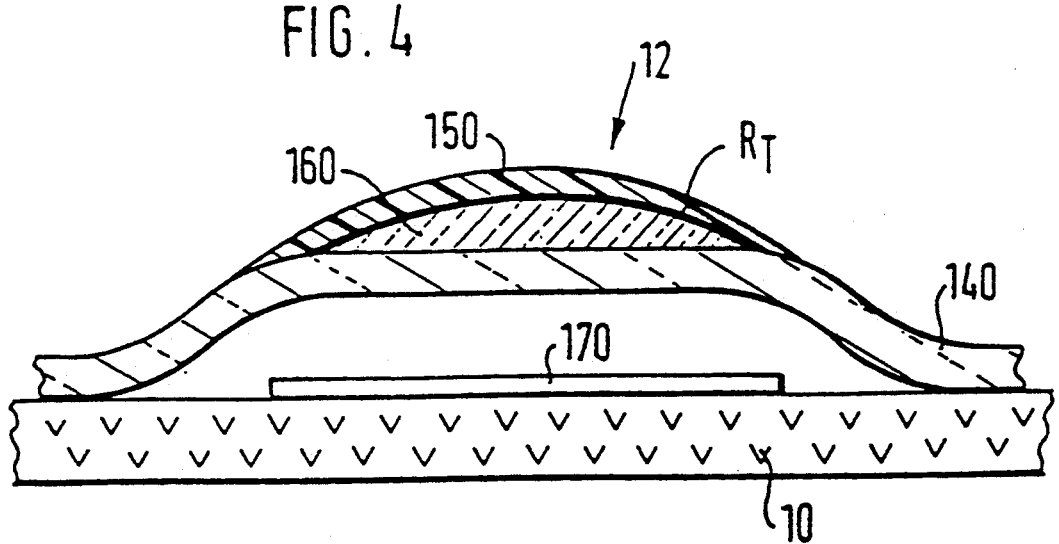

FIG. 4 shows a section along the line IV—IV in FIG. 2. It can be recognized from FIG. 4 that the construction of the further bubble 12 in which the further sensor film resistor $R_T$ is accommodated largely corresponds to that of the bubble 11. The platform 170 of the bubble 12 corresponds to the platform 17 of the bubble 11, the diaphragm 140 corresponds to the diaphragm 14, the protective film 150 corresponds to the protective film 15 and the intermediate film 160 corresponds to the intermediate film 16. A material having very good thermal conductivity is used for the protective film 150 of the bubble 12.

The manufacturing process described below relates to the thick-film bubble 11, shown in FIG. 3, in which the two film resistors $R_H$ and $R_S$ are accommodated. However, the further thick-film bubble 12 having the further sensor film resistor $R_T$ accommodated therein is manufactured in a corresponding manner.

The process begins with a platform 17, consisting of a thick-film paste, being printed onto the ceramic substrate 10 at the location at which the bubble 11 is to be attached and then being dried and fired in air. A film of carbon paste, not shown in FIG. 3, is then printed onto the platform 17 and subsequently dried and fired in nitrogen. During the firing of the carbon paste in nitrogen, essentially only the volatile constituents escape, but the carbon is retained. A film consisting of a ceramic thick-film paste is then printed onto the carbon film and a marginal area surrounding it, and the system is subsequently fired in nitrogen and then in air. During the firing of the system in air, the carbon film burns out completely and the film applied to the carbon film is arched to form a diaphragm. Since the diaphragm, at this stage of the process, is still too porous and too thin, it is subsequently strengthened by the inclusion of glass and compressed. This results in the diaphragm 14, as shown in FIG. 3.

A glass film 16 is now printed onto the diaphragm 14, which glass film 16 serves as a backing for the film system to be applied thereto and containing the film resistors $R_S$ and $R_H$ and is intended to improve the adhesion and the homogeneity of this film system. However, if the material for the diaphragm 14 is suitably selected, the glass film 16 can also be omitted.

A paste containing platinum is used to manufacture the sensor film resistor $R_S$. The intermediate film 13 is then printed and after that the heating film resistor $R_H$ is printed. The intermediate film 13 is made of a glass, which ensures on the one hand good thermal coupling and on the other hand good electrical insulation of the two films $R_H$ and $R_S$. A platinum-resinate paste is preferably used for printing the heating film resistor $R_H$. But another thick-film resistance paste can also be used instead.

The protective film 15 is then applied. The protective film 15 protects the film elements $R_H$ and $R_S$ and the strip conductors 18, not shown in FIG. 3, from contamination and corrosion.

Figure 5:
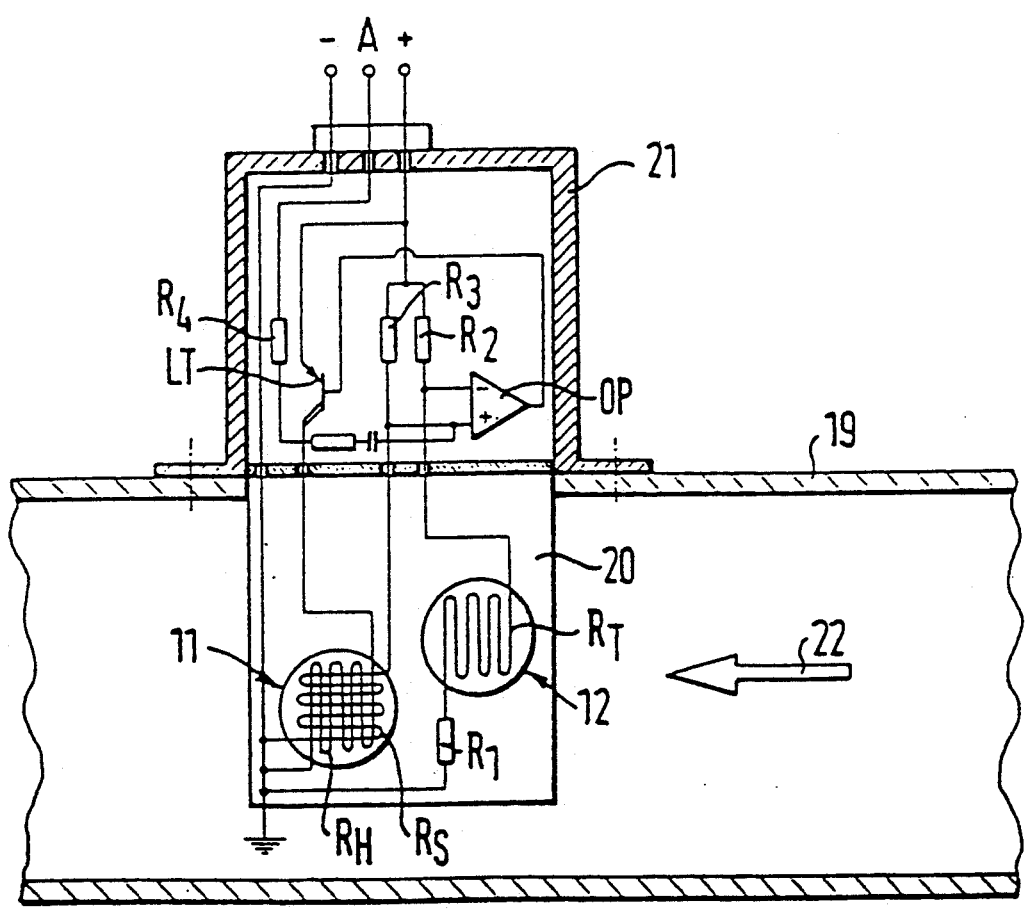

FIG. 5, as an example of application of an air-mass flow meter according to the invention, shows a construction which is intended for measuring the air quantity drawn in the suction pipe of a motor vehicle. The suction pipe is designated by 19, and the sensor element carrying the resistors $R_H$, $R_S$, $R_T$ and $R_1$ is designated by 20. The other circuit parts of the measuring device are accommodated in a housing 21 mounted on the suction pipe 19. The direction of the flowing air quantity is indicated by an arrow 22.

The invention is not restricted to the exemplary embodiments, described with reference to the drawing, of a device for measuring a flowing air quantity Many different modifications are conceivable. The device described can also be used for quantitative measurement in other flowing media, in particular in liquids.

Furthermore, freed from its use as a temperature sensor in an air-mass flow meter, the further sensor film resistor $R_T$ serving to sense the temperature of the flowing air quantity can also be used for other temperature-measuring tasks on solid bodies, liquids or gases. In this case, its integration with the film resistors $R_H$, $R_S$, and $R_1$ on the common substrate 10 is dispensed with.

We claim:

1. Device, for measuring a flowing air quantity, having
    a sensor element (20), exposed to the flowing air and constructed in thick-film technology, including
    an insulating substrate (10);
    a bubble (11) of ceramic material formed on said substrate (10) and including an arched membrane or diaphragm (14) having a substrate-adjacent side and a substrate-remote side;
    a film system arranged on said substrate-remote side of said membrane and thereby thermally uncoupled from said substrate (10), said film system including
a heating film resistor ($R_H$) adapted to be heated to a greater-than-ambient temperature by passing current therethrough,
a sensor film resistor ($R_S$) for sensing the temperature of the heating film resistor ($R_H$), and
a thermally-good-conducting yet electrically insulating intermediate film (13), located between said heating film resistor and said sensor film resistor, thermally coupling them together while electrically insulating them from each other, and
bridge circuit evaluation means, connected to said sensor film resistor, for measuring the temperature of said sensor film resistor, and thus of said heating film resistor thermally coupled thereto.

2. Device according to claim 1, characterized in that said intermediate film is made of glass.

3. Device according to claim 1, characterized in that said sensor film resistor ($R_S$), which serves to sense the temperature of the heating film resistor ($R_H$), is located between said membrane (14) and the heating film resistor ($R_H$).

4. Device according to claim 1, characterized in that said heating film resistor ($R_H$) is located between said membrane (14) and said sensor film resistor ($R_S$), which serves to sense the temperature of the heating film resistor ($R_H$).

5. Device according to claim 1, further comprising
a further sensor film resistor ($R_T$) which serves to sense the temperature of the flowing air quantity, is in thermal contact with the latter and is likewise a component of the bridge circuit, characterized in that
on the insulating substrate (10), there is formed, in an arched shape, a further bubble (12) which is made of ceramic material, in particular a glass ceramic;
that the further bubble (12) includes a further membrane (140) formed by thick-film technology; and that
said further sensor film resistor ($R_T$) is arranged on a side of said membrane (14) remote from said insulating substrate (10).

6. Device according to claim 5, characterized in that said membrane (14, 140) is reinforced by infusion of glass.

7. Device according to claim 5, characterized in that at least one of
the film system consisting of
the heating film resistor ($R_H$),
the intermediate film (13)
and the sensor film resistor ($R_S$), and
the further sensor film resistor ($R_T$) is covered with a protective film (15 or 150).

8. Device according to claim 5, characterized in that
an intermediate film (16 or 160), preferably made of glass, is arranged between the membrane (14) and the film system consisting of
the heating film resistor ($R_H$),
the intermediate film (13) and
the sensor film resistor ($R_S$),
or between the further diaphragm (140) and the further sensor film resistor ($R_T$).

* * * * *